(12) United States Patent
Hwang et al.

(10) Patent No.: US 8,234,685 B2
(45) Date of Patent: Jul. 31, 2012

(54) METHOD AND SYSTEM FOR RECEIVING DIGITAL BROADCASTING BY USING MOBILE COMMUNICATION TERMINAL

(75) Inventors: In-Seong Hwang, Seoul (KR); Hoo-Jong Kim, Seoul (KR)

(73) Assignee: SK Planet Co., Ltd. (KR)

( * ) Notice: Subject to any disclaimer, the term of this patent is extended or adjusted under 35 U.S.C. 154(b) by 322 days.

(21) Appl. No.: 12/611,161

(22) Filed: Nov. 3, 2009

(65) Prior Publication Data

US 2010/0083323 A1    Apr. 1, 2010

Related U.S. Application Data

(63) Continuation of application No. PCT/KR2008/002513, filed on May 2, 2008.

(30) Foreign Application Priority Data

May 3, 2007    (KR) .................................. 2007-43049

(51) Int. Cl.
*H04N 7/173*    (2011.01)

(52) U.S. Cl. .......................... 725/133; 725/141; 725/153
(58) Field of Classification Search .................... 725/80, 725/133, 141, 153; 348/734
See application file for complete search history.

(56) References Cited

U.S. PATENT DOCUMENTS

6,567,984 B1 *    5/2003  Allport ......................... 725/110
* cited by examiner

*Primary Examiner* — Hunter B Lonsberry
(74) *Attorney, Agent, or Firm* — Baker & Hostetler LLP

(57) ABSTRACT

Disclosed is a system and a method for receiving digital broadcasts by using a mobile communication terminal. The system includes a digital broadcast receiving device for receiving digital data from a contents provision unit by using a wired/wireless communication network and transmitting the digital data; and a mobile communication terminal for receiving the digital data from the digital broadcast receiving device, decoding the digital data, creating video and audio signals, and outputting the video and audio signals. The mobile communication terminal replaces circuits of the digital broadcast receiving device, which are in charge of predetermined functions. This simplifies the construction of the digital broadcast receiving device and reduces the cost for implementing the device.

2 Claims, 6 Drawing Sheets

METHOD AND SYSTEM FOR RECEIVING DIGITAL BROADCASTING BY USING MOBILE COMMUNICATION TERMINAL

This application is a continuation of Korean PCT Application No. PCT/KR2008/002513 filed on May 2, 2008 which designates the United States of America.

TECHNICAL FIELD

The present invention relates to a system and a method for receiving digital broadcasts by using a mobile communication terminal. More particularly, the present invention relates to a system and a method for receiving digital broadcasts by connecting a digital broadcast receiving device to a mobile communication terminal so that the mobile communication terminal replaces circuits of the digital broadcast receiving device, which is in charge of predetermined functions, thereby making it possible to develop inexpensive digital broadcast receiving devices.

BACKGROUND ART

As generally known in the art, recent development of electronic communication technology is followed by development and widespread use of digital broadcast receiving devices (e.g. set-top boxes) for receiving digital broadcasts from the Internet, satellites, etc. and outputting broadcast programs via video and audio output media (e.g. TVs).

Digital broadcast receiving devices may be integrated into conventional TVs. It is also possible to purchase a separate receiver and connect it to the TV so that the user can conveniently watch VOD (Video On Demand) or real-time digital broadcasts at home.

Figure 1:
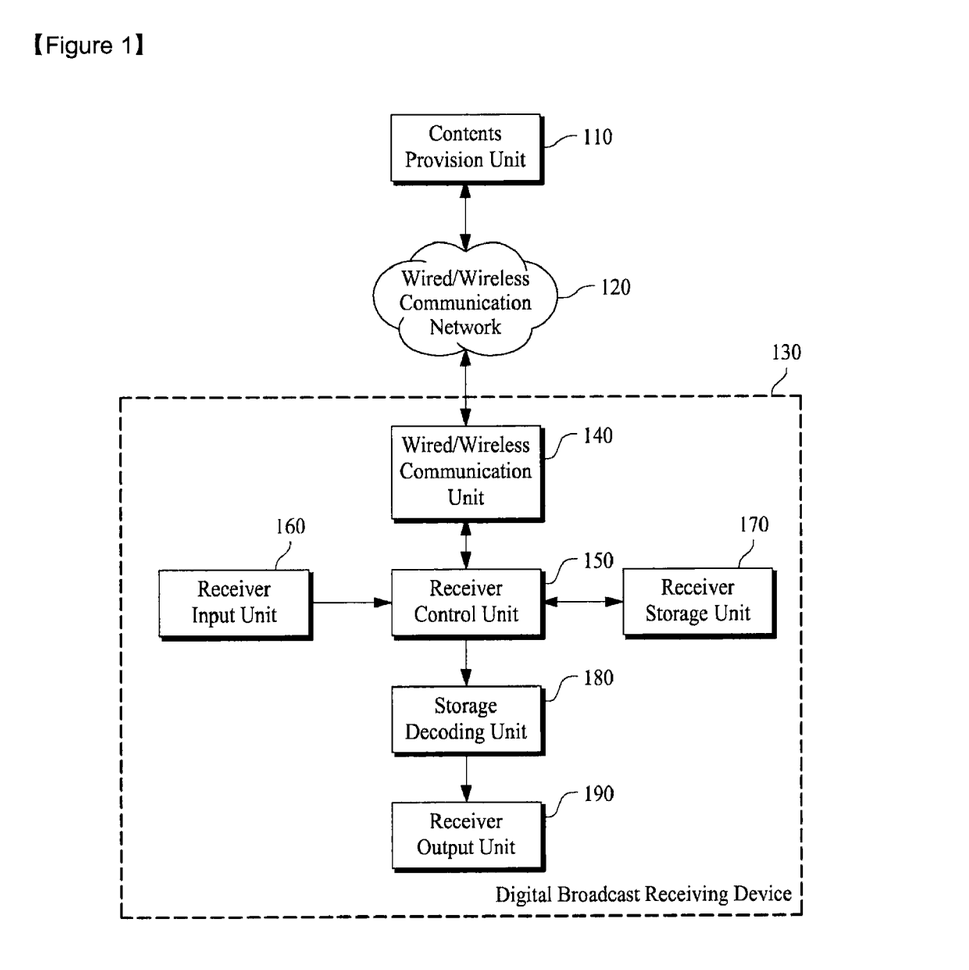
FIG. 1 is a block diagram briefly showing a conventional digital broadcast receiving system.

FIG. 1 is a block diagram briefly showing a conventional digital broadcast receiving system.

The conventional digital broadcast receiving system includes a contents provision unit 110, a wired/wireless communication network 120, and a digital broadcast receiving device 130.

The contents provision unit 110 refers to a server of a broadcast program provider, which creates broadcast programs as digital data and transmits them via the wired/wireless communication network 120. Particularly, the contents provision unit 110 is a server or a satellite of a broadcast provider, who provides Internet broadcasts, DMB (Digital Multimedia Broadcasting) programs, IPTV (Internet Protocol TV) broadcasts, etc.

The wired/wireless communication network 120 refers to a network capable of transmitting/receiving data based on an Internet protocol by using various wired/wireless communication technologies, such as the Internet, Intranet, mobile communication networks, satellite communication networks, etc.

The digital broadcast receiving device 130 refers to a set-top box, which is manufactured separately and connected to a TV to receive digital broadcasts, or a digital broadcast receiving TV, which has an integral receiver for receiving digital broadcasts. FIG. 1 exemplifies a digital broadcast receiving TV having an integral receiver for receiving digital broadcasts.

The digital broadcast receiving device 130 includes a wired/wireless communication unit 140, a receiver control unit 150, a receiver input unit 160, a receiver storage unit 170, a receiver decoding unit 180, and a receiver output unit 190.

The wired/wireless communication unit 140 is a communication means for receiving digital data from the contents provision unit 110 by using the wired/wireless communication network 120. The receiver control unit 150 is a control means for controlling the overall operation of the digital broadcast receiving device 130, as well as controlling data and signals inside the digital broadcast receiving device 130.

The receiver input unit 160 is a wired/wireless input means for receiving inputted commands or data for controlling the digital broadcast receiving device 130, such as a keyboard, a mouse, a joystick, a game pad, etc. The receiver storage unit 170 is a data storage means, such as a flash memory, a hard disk, a CD-ROM, a DVD, etc.

The receiver decoding unit 180 is a reproduction means for decoding digital data, which has been received by the receiver control unit 150 via the wired/wireless communication means 140, or which has been stored in the receiver storage unit 170, to create video and audio signals.

The receiver output unit 190 is an output means for outputting images and sounds via a screen or a speaker inside the digital broadcast receiving device 130. If the digital broadcast receiving device 130 is connected to an external video/audio output device, the receiver output unit 190 transmits video and audio signals to the video/audio output device and controls the video/audio output device to output images and sounds.

The operation process within the digital broadcast receiving device 130 is as follows: the user chooses to receive digital broadcasts by using the receiver input unit 160. Then, the wired/wireless communication unit 140 receives digital data from the contents provision unit 110 and transmits the data to the receiver control unit 150, which forwards the data to the receiver decoding unit 180. Then, the receiver decoding unit 180 decodes the digital data to create video and audio signals, and the receiver output unit 190 outputs images and sounds.

If the user decides to watch VOD and chooses desired contents by using the receiver input unit 160, the wired/wireless communication unit 140 receives digital data from the contents provision unit 110 and forwards the data to the receiver control unit 150, which stores the digital data in the receiver storage unit 170. The digital data stored in the receiver storage unit 170 is transmitted to the receiver decoding unit 180, which then decodes the digital data and creates video and audio signals. The receiver output unit 190 outputs images and sounds.

Such a digital broadcast receiving device is expensive due to the above-mentioned electronic devices. Watchers cannot watch digital broadcasts without such digital broadcast receiving devices.

Meanwhile, mobile communication technology has become widespread in line with the developing electronic communication technology. As a result, mobile communication terminals (e.g. cellular phones) have become daily necessities of modern people.

Mobile communication terminals are also evolving to receive and reproduce digital broadcasts, as well as reproduce stored digital data.

Therefore, if mobile communication terminals can replace some electronic devices for specific functions of digital broadcast receiving devices, the cost for implementing digital broadcast receiving devices will be reduced substantially.

However, conventional digital broadcast receiving devices 130 are manufactured and used separate from mobile communication terminals. Thus, it is expected to develop technology enabling both devices to interwork with each other so that the mobile communication terminals can conduct some functions of the digital broadcast receiving devices, thereby improving the price competitiveness of digital broadcast receiving devices.

DISCLOSURE

Technical Solution

Therefore, the present invention has been made in view of the above-mentioned problems, and the present invention provides a system and a method for receiving digital broadcasts by connecting a digital broadcast receiving device to a mobile communication terminal so that the mobile communication terminal replaces circuits of the digital broadcast receiving device, which is in charge of predetermined functions, thereby making it possible to develop inexpensive digital broadcast receiving devices.

In accordance with an aspect of the present invention, there is provided a system for receiving and outputting digital data for digital broadcasts provided from a contents provision unit by using a wired/wireless communication network, the system including a digital broadcast receiving device for receiving the digital data from the contents provision unit by using the wired/wireless communication network and transmitting the digital data; and a mobile communication terminal for receiving the digital data from the digital broadcast receiving device, decoding the digital data, creating video and audio signals, and outputting the video and audio signals.

According to another aspect of the present invention, there is provided a system for receiving and outputting digital data for digital broadcasts provided from a contents provision unit by using a wired/wireless communication network, the system including a digital broadcast receiving device including a wired/wireless communication unit for receiving the digital data from the contents provision unit by using the wired/wireless communication network, a receiver control unit for controlling data and signals of the digital broadcast receiving device, and a receiver short-range communication unit for transmitting the digital data; and a mobile communication terminal including a terminal short-range communication unit for receiving the digital data from the receiver short-range communication unit, a terminal input unit for receiving an input of a command or data for controlling the mobile communication terminal, a terminal storage unit for storing the digital data, a terminal control unit for controlling data and signals of the mobile communication terminal, a terminal decoding unit for decoding the digital data, creating video and audio signals, and transmitting the video and audio signals, and a terminal output unit for receiving the video and audio signals and outputting images and sounds.

According to another aspect of the present invention, there is provided a method for receiving and reproducing digital data for digital broadcasts provided from a contents provision unit by using a wired/wireless communication network, a digital broadcast receiving device, and a mobile communication terminal, the method including the steps of (a) connecting the digital broadcast receiving device to the mobile communication terminal so that the digital broadcast receiving device and the mobile communication terminal enter into a standby mode; (b) receiving the digital data from the contents provision unit via the wired/wireless communication network by the digital broadcast receiving device; (c) receiving the digital data from the digital broadcast receiving device by the mobile communication terminal; (d) decoding the digital data and creating video and audio signals by the mobile communication terminal; and (e) outputting images and sounds based on the video and audio signals by the mobile communication terminal.

DESCRIPTION OF DRAWINGS

The foregoing and other objects, features and advantages of the present invention will become more apparent from the following detailed description when taken in conjunction with the accompanying drawings in which.

MODE FOR INVENTION

Hereinafter, exemplary embodiments of the present invention will be described with reference to the accompanying drawings. In the following description and drawings, the same reference numerals are used to designate the same or similar components, and so repetition of the description on the same or similar components will be omitted. Furthermore, a detailed description of known functions and configurations incorporated herein is omitted to avoid making the subject matter of the present invention unclear.

Figure 2:
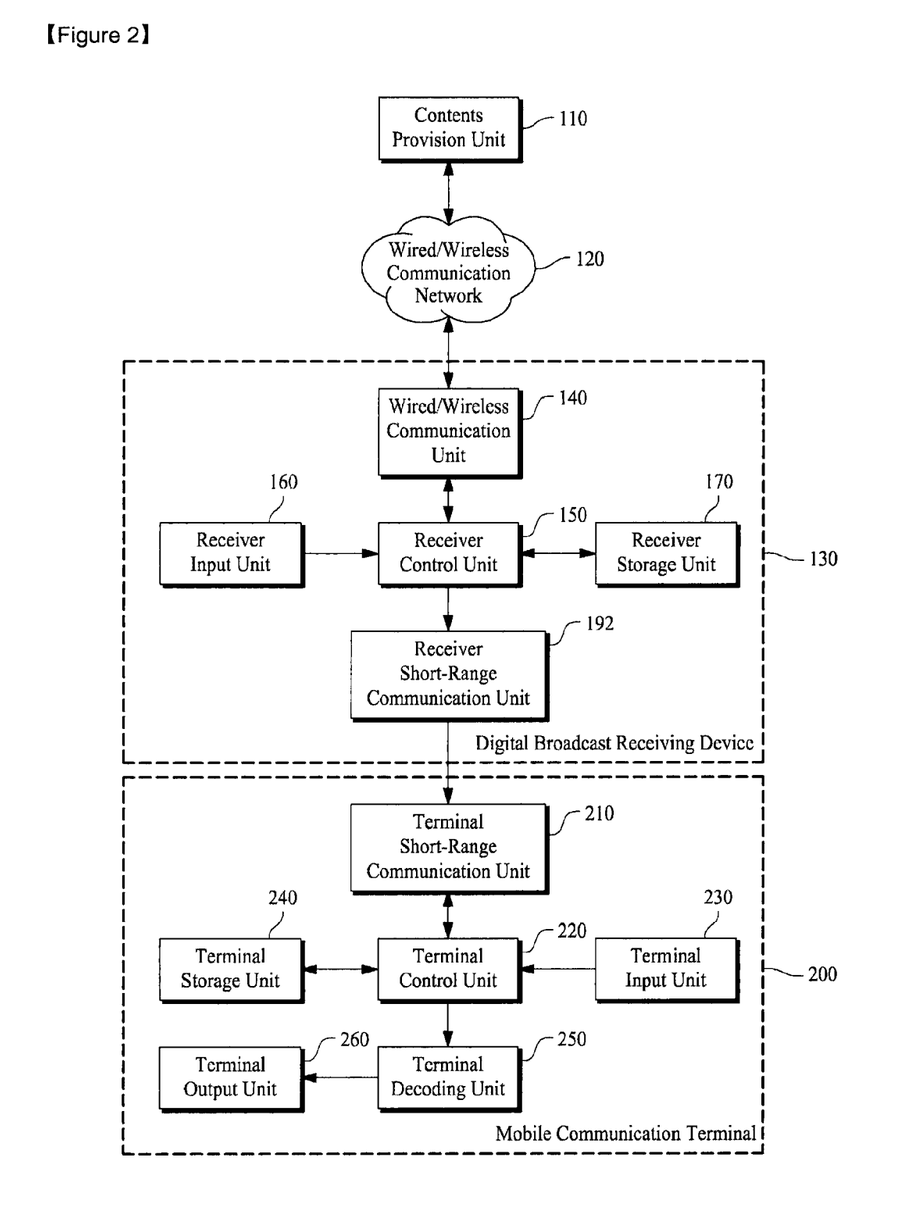
FIG. 2 is a block diagram briefly showing a digital broadcast receiving system using a mobile communication terminal according to a first embodiment of the present invention.

FIG. 2 is a block diagram briefly showing a digital broadcast receiving system using a mobile communication terminal according to a first embodiment of the present invention.

The digital broadcast receiving system using a mobile communication terminal according to a first embodiment of the present invention includes a contents provision unit 110, a wired/wireless communication network 120, a digital broadcast receiving device 130, and a mobile communication terminal 200.

The contents provision unit 110 and the wired/wireless communication network 120 have already been described with reference to FIG. 1, and repeated description thereof will be omitted herein.

The digital broadcast receiving system according to the first embodiment of the present invention includes a wired/wireless communication unit 140, a receiver control unit 150, a receiver input unit 160, a receiver storage unit 170, and a receiver short-range communication unit 192.

The wired/wireless communication unit 140, the receiver control unit 150, the receiver input unit 160, and the receiver storage unit 170 are similar or identical to those described with reference to FIG. 1, and repeated description thereof will be omitted herein.

The receiver short-range communication unit 192 is a communication means for conducting data communication with the terminal short-range communication unit 210 of the mobile communication terminal 200 to connect between the digital broadcast receiving device 130 and the mobile communication terminal 200. The receiver short-range communication unit 192 is adapted to conduct a wired or wireless type of communication, such as USB (Universal Serial Bus), serial communication, UWB (Ultra Wide Band) communication, IEEE (Institute of Electrical and Electronics Engineers) 1394, MDDI (Mobile Display Digital Interface), etc.

The mobile communication terminal 200 according to the first embodiment of the present invention includes a terminal short-range communication unit 210, a terminal control unit 220, a terminal input unit 230, a terminal storage unit 240, a terminal decoding unit 250, and a terminal output unit 260.

The terminal short-range communication unit 210 is a communication means for conducting data communication with the receiver short-range communication unit 192 of the digital broadcast receiving device 130 to connect between the mobile communication terminal 200 and the digital broadcast receiving device 130, receive digital data from the receiver short-range communication unit 192, and transmit it. The terminal short-range communication unit 210 is adapted for wired or wireless communication, as in the case of the above-mentioned receiver short-range communication unit 192.

The terminal control unit 220 controls the overall operation of the mobile communication terminal 200, and controls data and signals of the mobile communication terminal 200.

The terminal input unit 230 is an input means for receiving the user's input of commands or data for controlling the mobile communication terminal 200. The terminal input unit 230 is not limited to a keypad or a touch screen, but any type of input means can be used as long as commands or data can be inputted from an external device via USB or serial communication.

The terminal storage unit 240 is a data storage means for storing data in the mobile communication terminal 200, such as an embedded or external flash memory, a hard disk, or other types of data storage means.

The terminal decoding unit 250 is a reproduction means for decoding digital data received from the terminal control unit 220 and creating video and audio signals.

The terminal output unit 260 is a video/audio output means of the mobile communication terminal 200. The terminal output unit 260 has an LCD and a speaker for outputting images and sounds. Alternatively, the terminal output unit 260 receives video and audio signals, transmits them to an external video/audio output device connected to it, and controls the video/audio output device to output images and sounds.

When the user connects the digital broadcast receiving device 130 to the mobile communication terminal 200, the digital broadcast receiving device 130 and the mobile communication terminal 200 confirm whether or not they are connected to each other. When connection is confirmed, they enter into a standby mode and prepare for communication between them.

When the receiver input unit 160 of the digital broadcast receiving device 130 receives the user's selection to watch real-time digital broadcasts, the wired/wireless communication unit 140 receives digital data from the contents provision unit 110 and transmits it to the receiver control unit 150, which forwards the data to the receiver short-range communication unit 192. Upon receiving digital data in a standby mode, the receiver short-range communication unit 192 communicates with the terminal short-range communication unit 210 and transmits digital data to it.

The terminal short-range communication unit 210 forwards digital data from the receiver short-range communication unit 192 to the terminal control unit 220. The digital data is transmitted from the terminal control unit 220 to the terminal decoding unit 250, which decodes the digital data, creates video and audio signals, and transmits the signals to the terminal output unit 260.

The terminal output unit 260 outputs images and sounds by using its LCD and speaker. Alternatively, the terminal output unit 260 transmits video and audio signals to an external video/audio device connected to it, and controls the video/audio device to output images and sounds.

When the receiver input unit 160 of the digital broadcast receiving device 130 receives the user's selection to watch VOD, the wired/wireless communication unit 140 receives digital data from the contents provision unit 110 and forwards it to the receiver control unit 150, which stores the digital data in the receiver storage unit 170 and transmits the data to the receiver short-range communication unit 192. Upon receiving digital data in a standby mode, the receiver short-range communication unit 192 communicates with the terminal short-range communication unit 210 and transmits digital data to the terminal short-range communication unit 210. The following procedure is the same as the procedure for watching digital broadcasts in real time, and further description thereof will be omitted herein.

Figure 3:
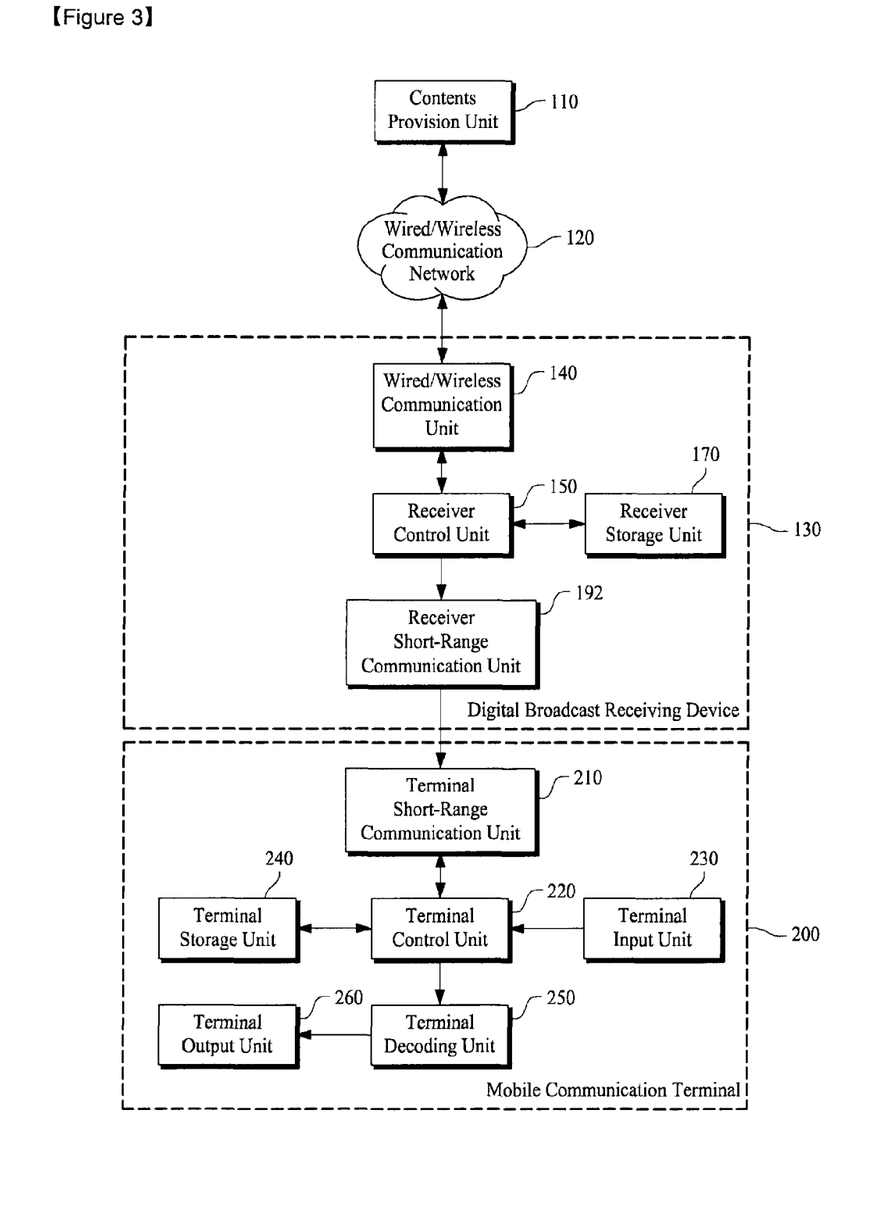
FIG. 3 is a block diagram briefly showing a digital broadcast receiving system using a mobile communication terminal according to a second embodiment of the present invention.

FIG. 3 is a block diagram briefly showing a digital broadcast receiving system using a mobile communication terminal according to a second embodiment of the present invention.

The digital broadcast receiving system using a mobile communication terminal according to the second embodiment of the present invention includes all components of the digital broadcast receiving system using a mobile communication terminal according to the first embodiment of the present invention, which have been described with reference to FIG. 2. However, the digital broadcast receiving system using a mobile communication terminal according to the second embodiment of the present invention does not include the receiver input unit 160 of the digital broadcast receiving device 130, but uses the terminal input unit 230 of the mobile communication terminal 200 to receive the user's input of data or commands.

Particularly, the digital broadcast receiving system using a mobile communication terminal according to the second embodiment of the present invention has removed the receiver input unit 160 from the digital broadcasting receiving device 130, and uses the terminal input unit 230 of the mobile communication terminal 200 to receive the user's input of data or commands for watching real-time digital broadcasts or VOD. This simplifies the construction of the digital broadcast receiving device 130 and reduces the cost for implementing it.

The remaining components of the digital broadcast receiving system using a mobile communication terminal according to the second embodiment of the present invention are the same as those described with reference to FIG. 2, and repeated description thereof will be omitted herein. A process for receiving digital broadcasts by using respective components will now be described.

When the user connects the digital broadcast receiving device 130 to the mobile communication terminal 200, the digital broadcast receiving device 130 and the mobile communication terminal 200 confirm whether or not they are connected to each other. When connection is confirmed, they enter into a standby mode and prepare for communication between them.

When the terminal input unit 230 of the mobile communication terminal 200 receives the user's selection to watch real-time digital broadcasts, the terminal control unit 220 transmits the command for watching digital broadcasts to the receiver short-range communication unit 192 by using the terminal short-range communication unit 210. The receiver short-range communication unit 192 forwards the transmitted command to the receiver control unit 150, which controls the wired/wireless communication unit 140 to receive broadcasts according to the command.

The wired/wireless communication unit 140 receives digital data from the contents provision unit 110 and transmits the data to the receiver control unit 150, which forwards the data to the receiver short-range communication unit 192. Upon receiving digital data in a standby mode, the receiver short-range communication unit 192 communicates with the terminal short-range communication unit 210 and transmits digital data to it.

The terminal short-range communication unit 210 forwards the digital data from the receiver short-range communication unit 192 to the terminal control unit 220. The digital data is transmitted from the terminal control unit 220 to the terminal decoding unit 250, which decodes the digital data, creates video and audio signals, and transmits the signals to the terminal output unit 260.

The terminal output unit 260 outputs images and sounds by using its LCD and speaker. Alternatively, the terminal output unit 260 transmits video and audio signals to an external video/audio device connected to it, and controls the video/audio device to output images and sounds.

When the terminal input unit 230 of the mobile communication terminal 200 receives the user's selection to watch VOD, the terminal control unit 220 transmits the command for watching digital broadcasts to the receiver short-range communication unit 192 by using the terminal short-range communication unit 210. The receiver short-range communication unit 192 forwards the transmitted command to the receiver control unit 150, which controls the wired/wireless communication unit 140 to receiver broadcasts according to the command.

The wired/wireless communication unit 140 receives digital data from the contents provision unit 110 and forwards the data to the receiver control unit 150, which stores the digital data in the receiver storage unit 170 and transmits the data to the receiver short-range communication unit 192. Upon receiving digital data in a standby mode, the receiver short-range communication unit 192 communicates with the terminal short-range communication unit 210 and transmits digital data to the terminal short-range communication unit 210.

The following procedure is the same as the procedure for watching digital broadcasts in real time, and further description thereof will be omitted herein.

The following procedure is the same as the procedure for watching digital broadcasts in real time, and detailed description thereof will be omitted herein.

Figure 4:
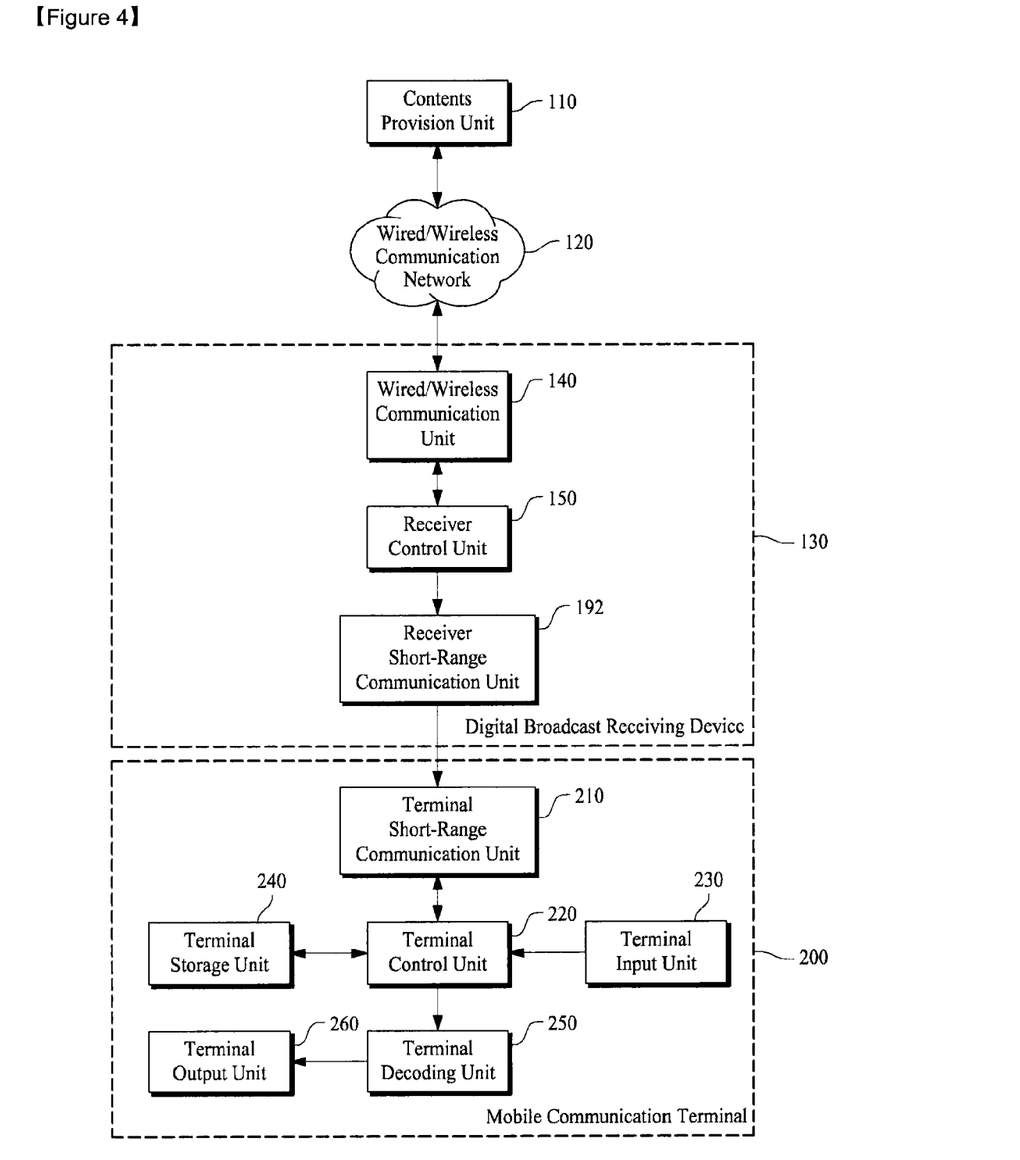
FIG. 4 is a block diagram briefly showing a digital broadcast receiving system using a mobile communication terminal according to a third embodiment of the present invention.

FIG. 4 is a block diagram briefly showing a digital broadcast receiving system by using a mobile communication terminal according to a third embodiment of the present invention.

The digital broadcast receiving system using a mobile communication terminal according to the third embodiment of the present invention includes all components of the digital broadcast receiving system using a mobile communication terminal according to the first embodiment of the present invention, which have been described with reference to FIG. 2. However, the digital broadcast receiving system using a mobile communication terminal according to the third embodiment of the present invention does not include the receiver input unit 160 and the receiver storage unit 170 of the digital broadcast receiving device 130, but uses the terminal input unit 230 of the mobile communication terminal 200 to receive the user's input of data or commands and uses the terminal storage unit 240 to store digital data received from the contents provision unit 110.

Particularly, the digital broadcast receiving system using a mobile communication terminal according to the third embodiment of the present invention has removed the receiver input unit 160 and the receiver storage unit 170 from the digital broadcasting receiving device 130, and uses the terminal input unit 230 of the mobile communication terminal 200 to receive the user's input of data or commands for watching real-time digital broadcasts or VOD and uses the terminal storage unit 240 to store digital data received from the contents provision unit 110 by the digital broadcast receiving device 130. This simplifies the construction of the digital broadcast receiving device 130 and reduces the cost for implementing it.

The remaining components of the digital broadcast receiving system using a mobile communication terminal according to the third embodiment of the present invention are the same as those described with reference to FIG. 2, and repeated description thereof will be omitted herein. A process for receiving digital broadcasts by using respective components will now be described.

When the user connects the digital broadcast receiving device 130 to the mobile communication terminal 200, the digital broadcast receiving device 130 and the mobile communication terminal 200 confirm whether or not they are connected to each other. When connection is confirmed, they enter into a standby mode and prepare for communication between them.

When the terminal input unit 230 of the mobile communication terminal 200 receives the user's selection to watch real-time digital broadcasts, the terminal control unit 220 transmits the command for watching digital broadcasts to the receiver short-range communication unit 192 by using the terminal short-range communication unit 210. The receiver short-range communication unit 192 forwards the transmitted command to the receiver control unit 150, which controls the wired/wireless communication unit 140 to receive broadcasts according to the command.

The wired/wireless communication unit 140 receives digital data from the contents provision unit 110 and transmits it to the receiver control unit 150, which forwards the data to the receiver short-range communication unit 192. Upon receiving digital data in a standby mode, the receiver short-range communication unit 192 communicates with the terminal short-range communication unit 210 and transmits digital data to it.

The terminal short-range communication unit 210 forwards digital data from the receiver short-range communication unit 192 to the terminal control unit 220. The digital data is transmitted from the terminal control unit 220 to the terminal decoding unit 250, which decodes the digital data, creates video and audio signals, and transmits the signals to the terminal output unit 260.

The terminal output unit 260 outputs images and sounds by using its LCD and speaker. Alternatively, the terminal output unit 260 transmits video and audio signals to an external video/audio device connected to it, and controls the video/audio device to output images and sounds.

When the terminal input unit 230 of the mobile communication terminal 200 receives the user's selection to watch VOD, the terminal control unit 220 transmits the command for watching digital broadcasts to the receiver short-range communication unit 192 by using the terminal short-range communication unit 210. The receiver short-range communication unit 192 forwards the transmitted command to the receiver control unit 150, which controls the wired/wireless communication unit 140 to receive broadcasts according to the command.

The wired/wireless communication unit 140 receives digital data from the contents provision unit 110 and forwards it to the receiver control unit 150, which transmits the digital data to the receiver short-range communication unit 192. Upon receiving digital data in a standby mode, the receiver short-range communication unit 192 communicates with the terminal short-range communication unit 210 and transmits digital data to the terminal short-range communication unit 210.

The terminal short-range communication unit 210 forwards the digital data from the receiver short-range communication unit 192 to the terminal control unit 220. Then, the terminal control unit 220 stores the digital data in the terminal storage unit 240 and transmits it to the terminal decoding unit 250. The terminal decoding unit 250 decodes the digital data, creates video and audio signals, and transmits them to the terminal output unit 260.

The terminal output unit 260 outputs images and sounds by using its LCD and speaker. Alternatively, the terminal output unit 260 transmits video and audio signals to an external video/audio device connected to it, and controls the video/audio device to output images and sounds.

Figure 5:
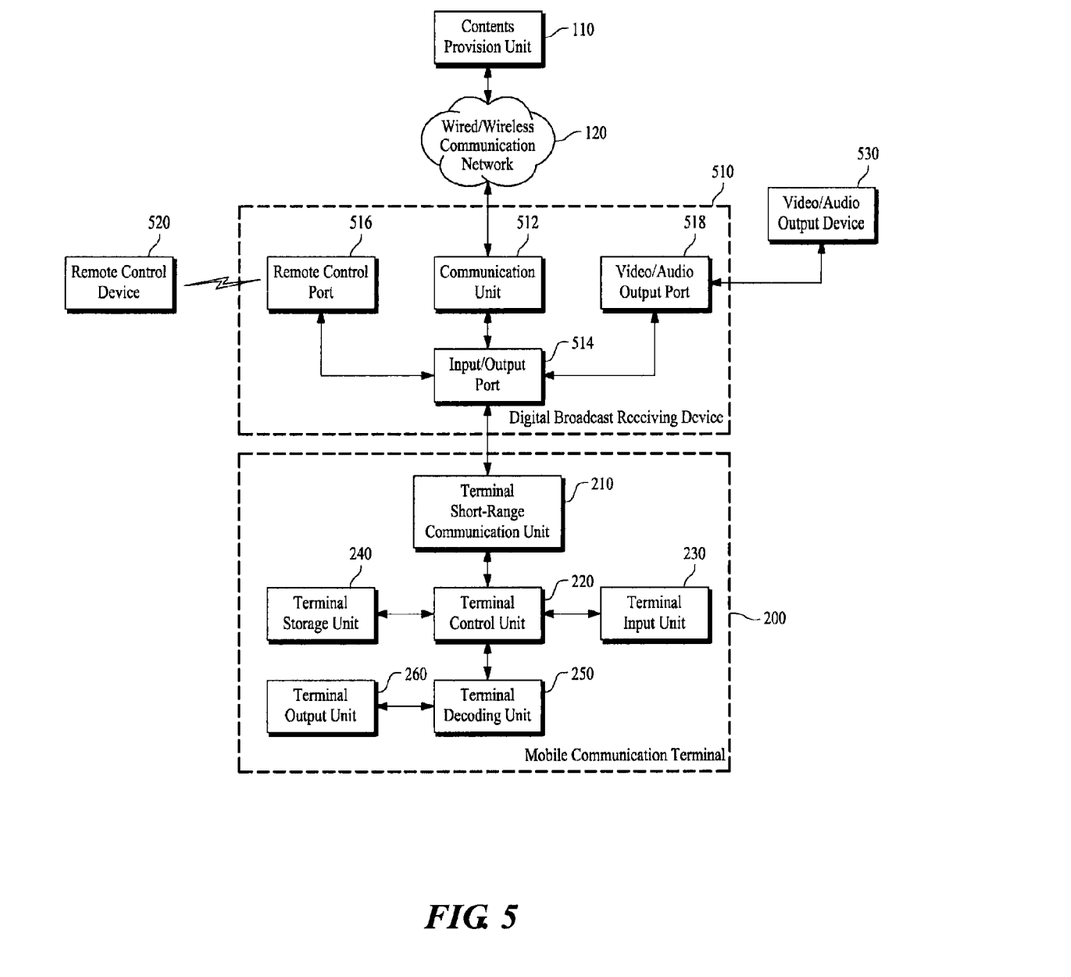
FIG. 5 is a block diagram briefly showing a digital broadcast receiving system using a mobile communication terminal according to a fourth embodiment of the present invention.

FIG. 5 is a block diagram briefly showing a digital broadcast receiving system using a mobile communication terminal according to a fourth embodiment of the present invention.

The digital broadcast receiving system using a mobile communication terminal according to the fourth embodiment of the present invention includes a contents provision unit 110, a wired/wireless communication network 120, a mobile communication terminal 200, a digital broadcast receiving device 510, a remote control device 520, and a video/audio output device 530.

The mobile communication terminal 200 includes a terminal short-range communication unit 210, a terminal control unit 220, a terminal input unit 230, a terminal storage unit 240, a terminal decoding unit 250, and a terminal output unit 260. Respective components of the mobile communication terminal 200 are similar or equal to those described with reference to FIG. 2, and will be referred to later in connection with FIG. 6 without repeating the same description.

The digital broadcast receiving device 510 includes a communication unit 512, an input/output port 514, a remote control port 516, and a video/audio output port 518. The digital broadcast receiving device 510 is shaped like a cellular phone cradle so that the mobile communication terminal 200 can be cradled thereon. In addition, the digital broadcast receiving device 510 relays signals from the remote control device 520 to the mobile communication terminal 200, and conducts communication via the wired/wireless communication network 120 under the control of the mobile communication terminal 200.

The communication unit 512 is a wired/wireless communication means having a NIC (Network Interface Card), such as a LAN card, or a wired/wireless communication modem to connect with the wired/wireless communication network 120 and conduct communication. The communication unit 512 includes not only chips for communication (e.g. modem), but also ports for connecting to an Internet cable, a LAN cable, or LAN-to-USB.

The input/output port 514 refers to a port for connecting to the mobile communication terminal 200. The input/output port 514 may have a 24-pin interface or a 20-pin structure (Korea Telecommunication Technology Association is recently developing a scheme for using 20 pins on the external port of mobile communication terminals). The input/output port 514 uses a specific number of pins among the 24 or 20 pins to exchange data with the mobile communication terminal 200. To this end, the input/output port 514 is connected to the communication unit 512, the remote control port 516, and the video/audio output port 518.

The input/output port 514 is adapted to access and connect to the terminal short-range communication unit 210 of the mobile communication terminal 200 when the terminal 200 is coupled to and cradled on the digital broadcast receiving device 510. As such, the input/output port 514 is connected to the terminal short-range communication unit 210 to forward signals from the terminal short-range communication unit 210 of the mobile communication terminal 200 to the communication unit 510 or forward signals from the remote control device 520 to the mobile communication terminal 200 via the terminal short-range communication unit 210.

The remote control port 516 consists of an IR receiver, such as an IrDA (Infrared Data Association) receiver sensor, to receive remote control signals from the remote control device 520 and transmit the signals to the mobile communication terminal 200 via the input/output port 514.

The video/audio output port 518 is internally connected to the input/output port 514 and is externally connected to the video/audio output device 530 via a cable, for example, to receive video and audio signals from the mobile communication terminal 200 via the input/output port 514 and transmit the signals to the video/audio output device 530. To this end, the video/audio output port 516 may include a right audio port, a left audio port, and a composite video port. Alternatively, the video/audio output port 516 consists of a single video/audio port, such as a super-video port or an HDMI (High Definition Multimedia Interface) port.

The remote control device 520 is a control device for controlling other devices remotely (e.g. remote control system). Particularly, the remote control device 520 emits IR signals to the IR receiver of the remote control port 516 of the digital broadcast receiving device 510 to control the mobile communication terminal 200 connected to the digital broadcast receiving device 510.

The video/audio output device 530 is an output device for outputting large-screen images and sounds (e.g. TV). Particularly, the video/audio output device 530 receives sky waves and outputs images and sounds. Alternatively, the video/audio output device 530 receives video and audio signals from an external device and outputs them to a display device and an audio output device. The video/audio output device 530 has a video port for receiving video signals and an audio port for receiving audio signals, both of which are connected to the video/audio output port 516 of the digital broadcast receiving device 510.

Figure 6:
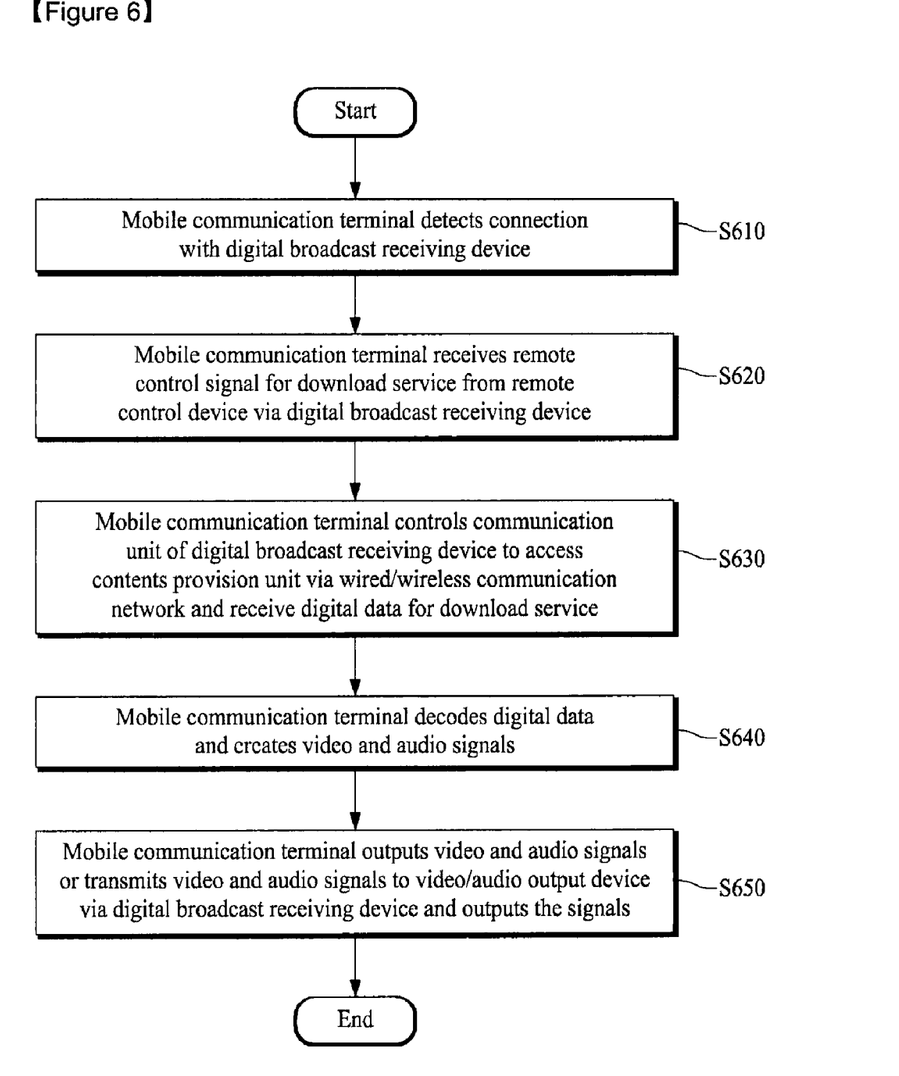
FIG. 6 is a flowchart showing a method for receiving digital broadcasts by using a mobile communication terminal according to the fourth embodiment of the present invention.

FIG. 6 is a flowchart showing a method for receiving digital broadcasts by using a mobile communication terminal according to the fourth embodiment of the present invention.

When the user inserts the mobile communication terminal 200 into the cradle of the digital broadcast receiving device 510, the mobile communication terminal 200 and the digital broadcast receiving device 510 are coupled to each other so that the terminal short-range communication unit 210 of the mobile communication terminal 200 is connected to the input/output port 514 of the digital broadcast receiving device 510. The terminal control unit 220 of the mobile communication terminal 200 senses the connection between the terminal short-range communication unit 210 and the input/output port 514, which means that the mobile communication terminal 200 is connected to the digital broadcast receiving device 510 (S610).

Upon sensing the connection between the terminal short-range communication unit 210 and the input/output port 514, the terminal control unit 220 activates the network communication mode and controls the communication unit 512 via the terminal short-range communication unit 210 and the input/output port 514 so that communication can be conducted.

When the user generates a remote control signal for real-time Internet broadcasting service, a VOD service, or a download service by using the remote control device 520 (e.g. remote control system), the remote control signal emitted from the remote control device 520 is received by the IR receiver of the remote control port 516 of the digital broadcast receiving device 510, and is transmitted to the terminal control unit 220 via the input/output port 514 and the terminal short-range communication unit 210. As such, the mobile communication terminal 200 receives the remote control signal from the remote control device 520 via the digital broadcast receiving device 510 (S620).

After receiving the remote control signal, the terminal control unit 220 analyzes the signal and confirms which of a real-time broadcasting service, a VOD service, and a download service the signal corresponds to. Then, the terminal control unit 220 controls the communication unit 512 of the digital broadcast receiving device 510 via the terminal short-range communication unit 210 and the input/output port 514 to access the contents provision unit 110, which is connected to the wired/wireless communication network 120, and receive digital data for a real-time broadcasting service, a VOD service, or a download service from the contents provision unit 110 (S630). After accessing the contents provision unit 110, the mobile communication terminal 200 outputs a user interface, which is provided by the contents provision unit 110, via the terminal output unit 260. In addition, the mobile communication terminal 200 navigates through and selects various service menus or digital data provided by the contents provision unit 110 according to the command or data inputted via the terminal input unit 230 so that digital data desired by the user is received and, if necessary, stored in the terminal storage unit 240.

After receiving the digital data, the terminal control unit 220 decodes the digital data by using the terminal decoding unit 250 and creates video and audio signals (S640). The terminal control unit 220 outputs the video and audio signals via the screen of the terminal output unit 260, or transmits the video and audio signals to the video/audio output device 530 (e.g. TV) via the terminal short-range communication unit 210 and the input/output port 514 and the video/audio output port 518 of the digital broadcast receiving device 510 so that the video/audio output device 530 outputs the video and audio signals (S650).

As mentioned above, the present invention has the following advantages: mobile communication terminals, which are daily necessities of modern people, are connected to digital broadcast receiving devices so that the mobile communication terminals replace circuits of the digital broadcast receiving devices, which are in charge of predetermined functions (i.e. decoding and reproducing digital data, receiving the user's input of data or commands, storing digital data). This simplifies the construction of the digital broadcast receiving devices and reduces the cost for implementing them. As a result, digital broadcast receiving devices can be supplied at a low price, which facilitates widespread use of digital broadcasts.

In addition, the inventive digital broadcast receiving device incorporates both the network communication function and the cradling function (i.e. the mobile communication terminal can be cradled on the digital broadcast receiving device), and receives digital data, which is decoded by the mobile communication terminal and outputted by the video/audio output device (e.g. TV) connected via the digital broadcast receiving device, so that the user can watch images and sounds.

Although several exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

As mentioned above, the present invention is applicable to digital broadcast receiving technology for developing inexpensive digital broadcast receiving devices. Particularly, mobile communication terminals replace circuits of digital broadcast receiving devices, which are in charge of predetermined functions. This simplifies the construction of digital broadcast receiving devices, reduces the cost for implementing them, and facilitates the widespread use of digital broadcast receiving devices and digital broadcasts.

The invention claimed is:

1. A mobile communications terminal for receiving and outputting digital data for digital broadcast receiving device, the digital broadcast receiving device receiving the digital data from the contents provision unit by using the wired or wireless communication network and transmitting the digital data to the mobile communication terminal, the mobile communication terminal comprising:

a terminal communication unit configured to be connected to the digital broadcast via a digital broadcast receiving device and receive the digital data from the digital broadcast receiving device;

a terminal input unit for receiving a command or data for controlling the mobile communication terminal from a user and also receiving another command or data for watching the digital broadcasts instead of the digital broadcast receiving device;

a terminal storage unit for controlling data and signals of the mobile communications terminal, identifying whether the mobile communication terminal and the digital broadcast receiving device are connected to each other and making the mobile communication terminal enter into standby mode for communicating with the digital broadcasting receiving device;

a terminal decoding unit for decoding the digital data to thereby create video and audio signals without process in the digital broadcast receiving device; and a terminal output unit for outputting the video and audio signals.

2. A method for receiving and reproducing digital data for digital broadcasts provided from a contents provision unit by using a wired or wireless communication network, a digital broadcast receiving device, and a mobile communication terminal, the method comprising:

connecting the digital broadcast receiving device to the mobile communication terminal so that the digital broadcast receiving device and the mobile communication terminal enter into a standby mode for communicating with each other;

receiving the digital data from the digital broadcast receiving device at the mobile communication terminal, when the digital broadcast receiving device receives the digital data from the contents provision unit via the wired/wireless communication network, and also receiving another command or data for watching the digital broadcasts instead of the digital broadcast receiving device;

storing the digital data received from the contents provision unit via the digital broadcast receiving device in a memory of the mobile communication terminal instead of the digital broadcast receiving device;

decoding the digital data to thereby create video and audio signals at a decoding unit of the mobile communication terminal without decoding process in the digital broadcast receiving device; and reproducing the video and audio signals at the mobile communication terminal.

* * * * *